March 18, 1969      F. C. ERKE      3,433,470
ENCLOSURE FOR A FLATBED TRAILER OR TRUCK BODY
Filed April 4, 1967      Sheet 1 of 2
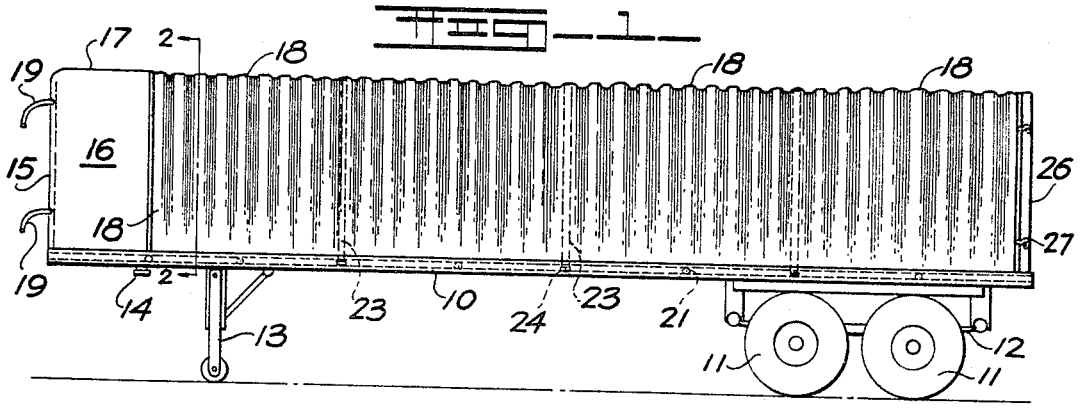
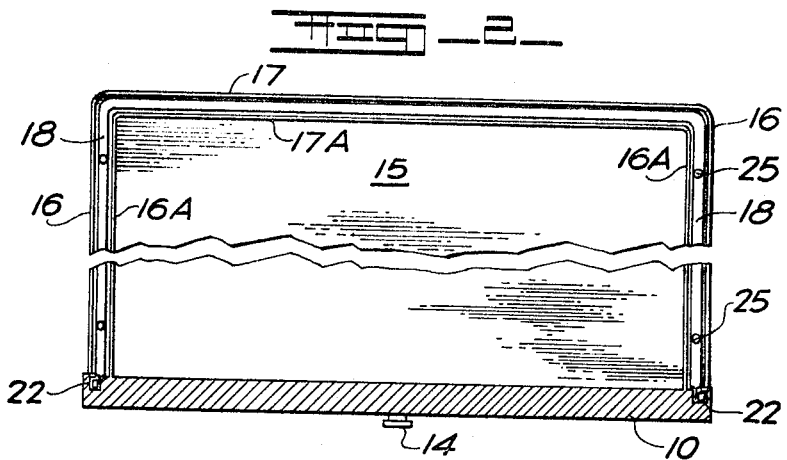
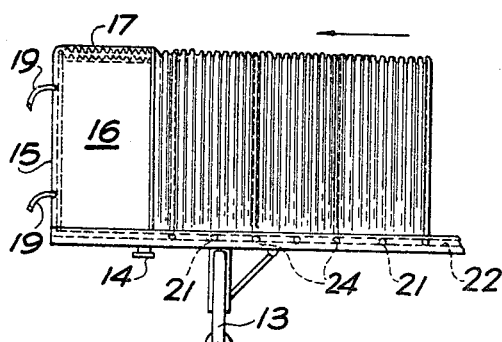 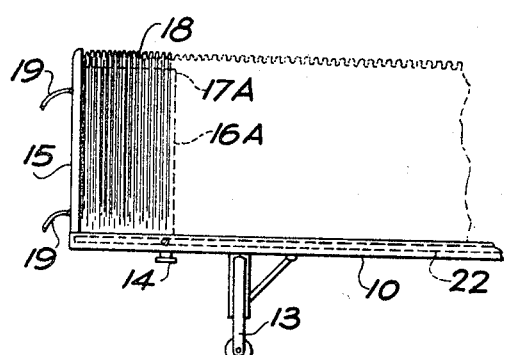
INVENTOR.
Frederick C. Erke
BY W. B. Harpman
ATTORNEY.

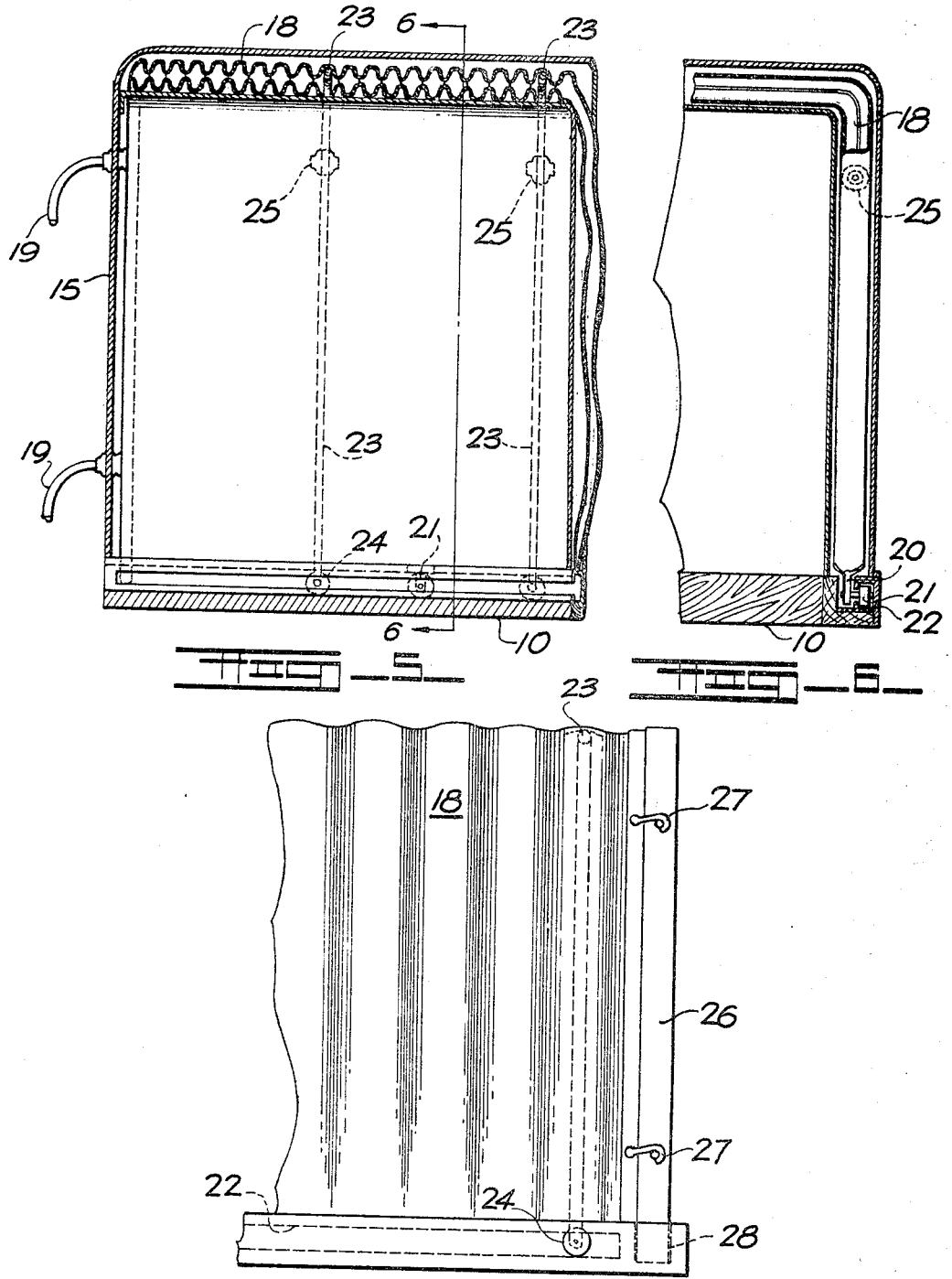

United States Patent Office 3,433,470
Patented Mar. 18, 1969

3,433,470
ENCLOSURE FOR A FLATBED TRAILER
OR TRUCK BODY
Frederick C. Erke, 706 Perkinswood SE.,
Warren, Ohio 44483
Filed Apr. 4, 1967, Ser. No. 628,349
U.S. Cl. 296—28                                    5 Claims
Int. Cl. B62d 33/04, 33/08, 23/00

ABSTRACT OF THE DISCLOSURE

A flexible, collapsible, inflatable side wall and roof structure for a truck or trailer body formed of air-tight double walled interconnected sections with valved communication ports therebetween, for progressive inflation and extension from a collapsed retracted position on one end of said truck or trailer body to an inflated extended covering position enclosing all of said truck or trailer body.

---

The principal object of the invention is the provision of a flexible, collapsible, inflatable side wall and roof construction for a flatbed truck or trailer body capable of being collapsed into a small space at one end of said truck or trailer body, and when inflated extendable over the entire truck or trailer body.

A further object of the invention is the provision of an inflatable wall and roof structure for a flatbed truck or trailer body that may be housed in a relatively small area on one end of said truck or trailer body, and moved outwardly therefrom progressively by air pressure introduced into said inflatable structure.

A still further object of the invention is the provision of a flexible, collapsible, inflatable side wall and roof structure for a truck or trailer body incorporating spaced roof bows contributing to the semirigid nature of the structure when inflated, and serving to hold it in desirable position when uninflated.

A still further object of the invention is the provision of an inflatable double walled side wall and roof construction for a truck or trailer body, the lower edges of the side walls having means movably engaging formations on the truck or trailer body.

The flexible, collapsible, inflatable side wall and roof construction disclosed herein adapted for use on flatbed trailers in particular, and may be used on flatbed truck bodies or the like if desired. Such flatbed trailers are commonly used for hauling bulky products such as coils of flat rolled steel and the like, and present practice makes it necessary to wrap the articles being hauled in order to protect them from the weather. The present invention provides an enclosure which may be moved from a relatively small storage area at one end of the truck or trailer body to an inflated extended position covering the entire body, and capable of protecting articles on the body from the weather.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side view of a trailer showing the flexible, collapsible, inflatable side wall and roof structure in inflated covering relation to the trailer.

FIGURE 2 is an enlarged cross sectional elevation on line 2—2 of FIGURE 1.

FIGURE 3 is a side view of a portion of a trailer showing the flexible, collapsible, inflatable side wall and roof structure being collapsed and moved toward and into a fixed housing at one end of the trailer body.

FIGURE 4 is a side view of a portion of a trailer showing the flexible, collapsible, inflatable side wall and roof structure in collapsed position over a supporting side wall and roof structure at one end of the trailer body.

FIGURE 5 is a vertical section longitudinally of a portion of a truck body showing a fixed side wall and roof construction consisting of spaced wall and roof sections with the flexible, collapsible, inflatable side wall and roof structure positioned therebetween, so as to be enclosed thereby when completely collapsed. Broken lines in FIGURE 5 illustrate partitions in the flexible, collapsible, inflatable side wall and roof structure and pressure operated air valves in said partitions.

FIGURE 6 is an end view on line 6—6 of FIGURE 5, and illustrating the means on the flexible, collapsible, inflatable side wall and roof structure movably engaging the truck or trailer body.

FIGURE 7 is an enlarged detail of a rear corner portion of the trailer body seen in FIGURE 1 of the drawings.

By referring to the drawings, and FIGURE 1 in particular, it will be seen that a trailer of the flatbed type has been disclosed and generally indicated by the numeral 10. Wheel and axle assemblies 11 are positioned beneath the rear end of the trailer 10 by conventional spring structures 12.

A foldable temporary front end support 13 is provided, as customary in the art, and the usual fitting 14 for engaging the fifth wheel of a tractor for towing the trailer is provided also as customary in the art.

The flatbed trailer 10 is provided with a front end structure including a front wall 15, short side walls 16 and a short roof structure 17 interconnecting the same. By referring to FIGURE 2 of the drawings it will be seen that the side walls 16 and roof structure 17 are actually double walls spaced with respect to one another, the inner spaced side walls being indicated by the numeral 16–A and the inner roof structure being indicated by the numeral 17–A. The space between the inner and outer side walls 16 and 16–A communicates with the space between the outer and inner roof structures 17 and 17–A, and is capable of and adapted to receive a plurality of hollow flexible, collapsible, inflatable side wall and roof sections 18. A plurality of such hollow flexible, collapsible, inflatable side wall and roof sections are provided sufficient to extend longitudinally of the flatbed of the trailer 10 and completely enclose the same when inflated. The front fixed structure comprising the side walls 16 and roof structure 17 and the front wall 15 are of a size sufficiently large to enclose the plurality of hollow flexible, collapsible, inflatable side wall and roof sections when they are collapsed and folded accordion-like into the space between the double walls hereinbefore described.

The front end of the hollow flexible, collapsible, inflatable side wall and roof section 18 immediately adjacent the front wall 15 is fixed relative to the front wall 15 so that upon air being introduced, as for example by way of a plurality of air hoses 19 from a pressure source such as that provided on a tractor for operating the air brakes thereof, etc., the resultant inflation and expansion of the hollow flexible, collapsible, inflatable side wall and roof sections 18 will cause them to move outwardly from their collapsed position in the fixed front end double wall structure and longitudinally of the flatbed of the trailer. In order that the successively inflating sections will move as desired, the lower edges of the same are secured at spaced intervals to depending lugs 20, which in turn carry offset rollers 21 engaged in guide ways 22 along the sides of the flatbed of the trailer 10.

A plurality of rigid roof bows 23 are positioned in spaced relation and preferably between the several sections of the hollow flexible, collapsible, inflatable side wall and roof sections 18, and the lower ends of each of the roof bows 23 are provided with offset rollers 24, which are also engaged in the guide ways 22 along the longitudinal side edges of the flatbed of the trailer 10.

It will thus be seen that when the hollow flexible, collapsible, inflatable side wall and roof sections 18 are inflated successively and they move outwardly and longitudinally of the trailer 10, their lower edges will be held to predetermined engagement with the trailer 10 by the guide ways 22 and the rollers 21 and 24 engaged therein. It will also be seen that as the structure extends rearwardly of the trailer 10 the roof bows 23 will become spaced with respect to one another and will assume suitable positions for insuring the rigidity and shape of the inflatable side wall and roof sections.

The side wall and roof sections are formed of airtight weather-resistant flexible material capable of collapsing in telescoped relation, as seen in FIGURES 3, 4 and 5 of the drawings, and upon being inflated assume a semirigid structure due to their formation in a corrugated panel-like pattern formed by web structures positioned between the double walls of the inflatable sections and holding spaced portions thereof in closer spaced relation than the immediately adjacent portions.

By referring now to FIGURES 2, 5 and 6, air control valves 25 may be seen installed in the partitions separating the hollow flexible, collapsible, inflatable side wall and roof sections 18. These air control valves are simple pressure operated flap valves arranged to block passageway of air therethrough until a predetermined pressure, for example three pounds per square inch, has been reached, whereupon air will then overcome the resiliency of the flap valve and open the same to flow into the adjacent section 18. Air is supplied to the endmost section 18 adjacent the front wall 15 and thus this first section expands first and upon reaching the indicated pressure, the air opens the valve 25 and flows into the second section and this continues progressively as the sections inflate and thus push the still uninflated remaining sections outwardly and longitudinally of the trailer body 10.

It will occur to those skilled in the art that the device will be operable without the outer walls 16 and 17, which merely form a protective housing for the hollow flexible, collapsible, inflatable side wall and roof sections 18 when they are in collapsed and stored position, and that an obvious modification of the invention may therefore comprise the formation of the device as hereinbefore disclosed without the outer walls 16 and 17, as seen in FIGURE 4 of the drawings where the inner walls 16-A and 17-A remain and form a supporting structure for the collapsed sections 18 when the same are in foremost stored and collapsed position as illustrated therein.

In the modification of FIGURE 4 the front wall 15 remains and the inner side walls 16-A remain, and the transverse top or roof portion 17-A remains, with the sections 18 simply sliding thereover and resting thereon, and it will be observed that these fixed walls on the forward end of the trailer 10 support and hold the collapsed sections 18 in storage position and prevent their interfering with the full use of the space on the flat bed of the trailer 10.

By referring now to FIGURES 1 and 7 of the drawings, it will be seen that the rear or right end of the trailer 10 is provided with an end frame 26, which is removably positioned in sockets 27 formed in the longitudinal edge portions of the flat bed of the trailer 10, and that the end frame 26 is an inverted U-shape so as to provide vertical corners and a transverse interconnecting top section, against which the outermost end of the outermost section 18 may be engaged. Interconnecting fasteners 27 on the respective portions enable the end section 18 to be secured to the end frame 26, as best shown in FIGURE 7 of the drawings.

It will thus be seen that a flexible, collapsible and inflatable side wall and roof structure for a flatbed truck or trailer body has been disclosed, which meets the several objects of the invention, and having thus described my invention, what I claim is:

1. An enclosure for a flatbed trailer or truck body consisting of a flexible, collapsible, inflatable side wall and roof structure formed of air-tight material in a double walled construction, webs interconnecting said double walls acting to hold said double walls in predetermined spaced relation when inflated, means for introducing air pressure into said inflatable side wall and roof structure, said side wall and roof structure subdivided into a plurality of sections with partitions therebetween and means in said partitions permitting air pressure flow between said sections when a predetermined air pressure is reached, means including spaced roof bows for supporting said side wall and roof structure in uninflated condition, and rollers on the lower longitudinal edges of said side wall and roof structure movably engaging said truck or trailer body and acting to secure said side wall and roof structure thereto, some of said rollers being connected to the ends of said roof bows.

2. The enclosure for a flatbed trailer or truck body set forth in claim 1, and wherein a guide configuration is formed in said trailer or truck body longitudinally thereof, said rollers being engaged in said guide configuration.

3. The enclosure for a flatbed trailer or truck body set forth in claim 1, and wherein said means in said partitions permitting air pressure flow between said sections comprises pressure actuated valves.

4. The enclosure for a flatbed trailer or truck body set forth in claim 1, and wherein said means for supporting said side wall and roof structure in uninflated condition includes a fixed side wall and roof structure on said trailer or truck body adjacent one end thereof.

5. The enclosure for a flatbed trailer or truck body set forth in claim 4, and wherein said fixed side wall and roof structure comprises a rigid double walled side wall and roof structure including a front wall located on said trailer or truck body, said double walls of said rigid side wall and roof structure being spaced apart so as to define an inverted U-shaped chamber in which said inflatable side wall and roof structure is wholly positioned in uninflated condition and partially positioned in inflated position.

References Cited

UNITED STATES PATENTS

| | | | |
|---|---|---|---|
| 2,659,110 | 11/1953 | Carroll | 52—2 |
| 2,807,499 | 9/1957 | Duddleston | 296—100 |
| 3,155,419 | 11/1964 | Garson et al. | 296—28 |
| 3,170,471 | 2/1965 | Schnitzer | 52—2 |
| 3,332,176 | 7/1967 | Knetzer | 52—2 |

LEO FRIAGLIA, *Primary Examiner.*

JOHN A. PEKAR, *Assistant Examiner.*

U.S. Cl. X.R.
52—2; 296—10, 100